United States Patent
Isono et al.

(10) Patent No.: US 12,263,727 B2
(45) Date of Patent: Apr. 1, 2025

(54) VEHICLE OPENING AND CLOSING BODY DRIVING DEVICE

(71) Applicant: AISIN CORPORATION, Kariya (JP)

(72) Inventors: Taishi Isono, Kariya (JP); Shinji Kazama, Kariya (JP); Akinori Suzuki, Kariya (JP)

(73) Assignee: AISIN CORPORATION, Kariya (JP)

( * ) Notice: Subject to any disclaimer, the term of this patent is extended or adjusted under 35 U.S.C. 154(b) by 305 days.

(21) Appl. No.: 17/822,916

(22) Filed: Aug. 29, 2022

(65) Prior Publication Data
US 2023/0104054 A1 Apr. 6, 2023

(30) Foreign Application Priority Data
Oct. 1, 2021 (JP) ................................. 2021-162801

(51) Int. Cl.
*B60J 5/06* (2006.01)
*E05F 15/643* (2015.01)
*E05F 15/655* (2015.01)

(52) U.S. Cl.
CPC ............. *B60J 5/06* (2013.01); *E05F 15/643* (2015.01); *E05F 15/655* (2015.01)

(58) Field of Classification Search
CPC ..... E05F 15/643; E05F 15/655; E05F 15/646; E05D 2015/1055
USPC ........................................ 296/155; 474/252
See application file for complete search history.

(56) References Cited

U.S. PATENT DOCUMENTS

| | | | | | |
|---|---|---|---|---|---|
| 4,330,287 | A | * | 5/1982 | Fischer | F16G 1/28 474/252 |
| 5,148,631 | A | * | 9/1992 | Bayard | E05F 15/565 49/449 |
| 5,168,666 | A | * | 12/1992 | Koura | E05F 15/646 49/360 |
| 5,308,291 | A | * | 5/1994 | Robertson | F16G 1/28 474/252 |
| 5,316,365 | A | * | 5/1994 | Kuhlman | E05F 15/646 49/216 |
| 5,551,190 | A | * | 9/1996 | Yamagishi | E05F 15/646 49/360 |
| 7,032,349 | B2 | * | 4/2006 | Oberheide | E05F 15/60 49/360 |
| 7,347,025 | B2 | * | 3/2008 | Fukumoto | E05F 15/646 49/360 |
| 9,957,746 | B2 | * | 5/2018 | Kaihatsu | H02K 7/116 |
| 2008/0178529 | A1 | * | 7/2008 | Yoshida | E05F 15/646 49/352 |

(Continued)

FOREIGN PATENT DOCUMENTS

JP 2019-100081 A 6/2019

*Primary Examiner* — Amy R Weisberg
*Assistant Examiner* — Veronica M Shull
(74) *Attorney, Agent, or Firm* — Oblon, McClelland, Maier & Neustadt, L.L.P.

(57) ABSTRACT

A vehicle opening and closing body driving device includes an annular driving belt including a coupling portion coupled to an opening and closing body of a vehicle and configured to be rotationally driven, and a guide frame having a sliding contact surface with which the driving belt is in sliding contact and extending in an opening and closing operation direction of the opening and closing body. The sliding contact surface is provided with a low sliding resistance portion having a plurality of recessed portions.

7 Claims, 6 Drawing Sheets

(56) References Cited

U.S. PATENT DOCUMENTS

2013/0320704 A1\* 12/2013 Sumiya ..................... B60J 5/06
49/506

\* cited by examiner

VEHICLE OPENING AND CLOSING BODY DRIVING DEVICE

CROSS REFERENCE TO RELATED APPLICATIONS

This application is based on and claims priority under 35 U.S.C. § 119 to Japanese Patent Application 2021-162801, filed on Oct. 1, 2021, the entire content of which is incorporated herein by reference.

TECHNICAL FIELD

This disclosure relates to a vehicle opening and closing body driving device.

BACKGROUND DISCUSSION

In the related art, there is a vehicle opening and closing body driving device which uses an annular driving belt to open and close an opening and closing body of a vehicle. JP-2019-100081A (Reference 1) discloses a door opening and closing device, in which a coupling portion coupled to a sliding door is provided on a driving belt. The door opening and closing device includes a guide frame extending in an opening and closing operation direction of the sliding door. Further, the driving belt is wound around a pair of pulleys provided at respective two ends of the guide frame. The door opening and closing device includes an actuator that rotationally drives the driving belt in this state.

Further, in the door opening and closing device in the related art, the driving belt is in sliding contact with the guide frame extending within an annular shape of the driving belt. Thus, in a state in which the driving belt is guided by the guide frame, the sliding door coupled to the driving belt opens and closes in a stable manner.

However, in the vehicle opening and closing body driving device as in the related art described above, when the opening and closing body is opened and closed by a driving force of the actuator or a manual operation, operation resistance of the opening and closing body tends to increase.

SUMMARY

A vehicle opening and closing body driving device according to an aspect of the disclosure includes an annular driving belt including a coupling portion coupled to an opening and closing body of a vehicle and configured to be rotationally driven, and a guide frame having a sliding contact surface with which the driving belt is in sliding contact and extending in an opening and closing operation direction of the opening and closing body. The sliding contact surface is provided with a low sliding resistance portion having a plurality of recessed portions.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, a first embodiment in which a vehicle opening and closing body driving device is embodied as a power sliding door device will be described with reference to the drawings.

Figure 1:
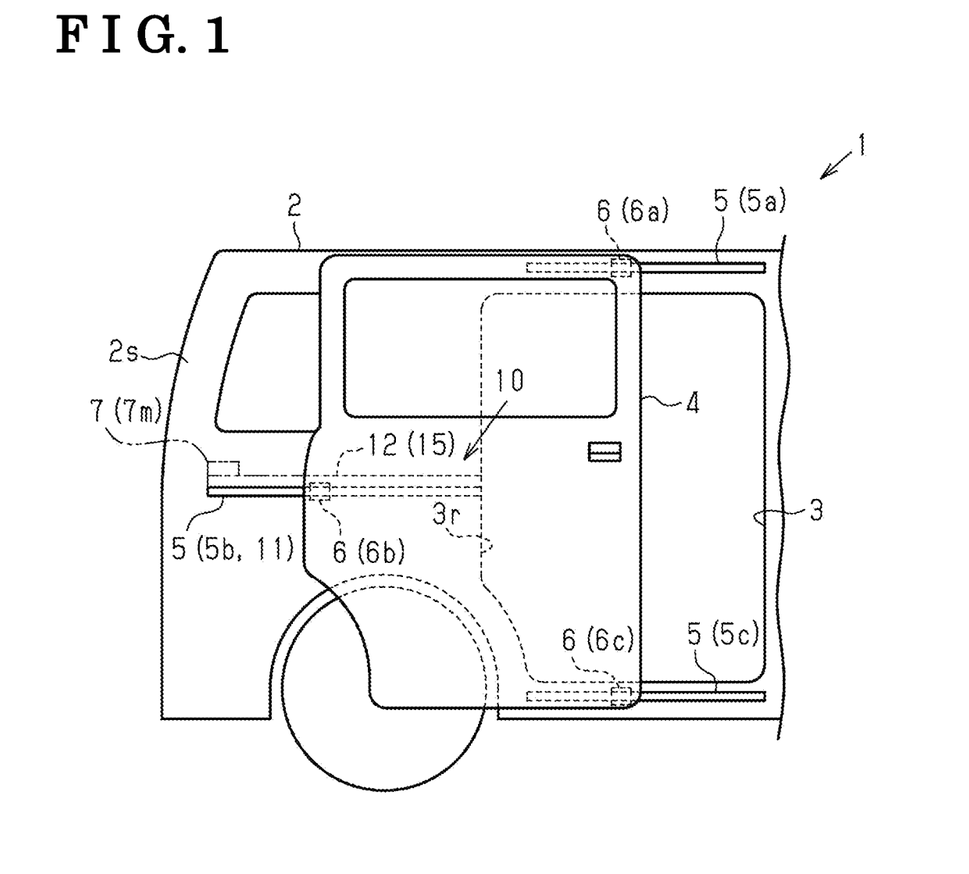
FIG. 1 is a side view of a vehicle provided with a power sliding door device.

As shown in FIG. 1, a vehicle 1 according to the present embodiment includes a sliding door 4 that opens and closes a door opening portion 3 provided on a side surface 2s of a vehicle body 2. Specifically, the vehicle 1 is provided with a plurality of guide rails 5a to 5c extending in a front-rear direction of the vehicle (a left-right direction in FIG. 1) and a plurality of guide roller units 6a to 6c coupled to the guide rails 5, respectively. That is, the sliding door 4 according to the present embodiment is supported on the side surface 2s of the vehicle body 2 by the guide rails 5 and the guide roller units 6. The guide rails 5 and the guide roller units 6 can move engagement positions of the guide roller units 6 with respect to the guide rails 5 along the extending direction of the guide rails 5. Thus, the sliding door 4 according to the present embodiment moves in the front-rear direction of the vehicle along the side surface 2s of the vehicle body 2.

That is, the sliding door 4 according to the present embodiment is in a fully closed state in which the door opening portion 3 is closed by moving the sliding door 4 to a front side of the vehicle (a right side in FIG. 1), and is in a fully open state in which an occupant of the vehicle 1 can get on and off the vehicle through the door opening portion 3 by moving the sliding door 4 to a rear side of the vehicle (a left side in FIG. 1). The vehicle 1 according to the present embodiment is provided with a power sliding door device 10 as the vehicle opening and closing body driving device that opens and closes the sliding door 4 based on a driving force generated by an actuator 7 using a motor 7m as a driving source.

Figure 2:
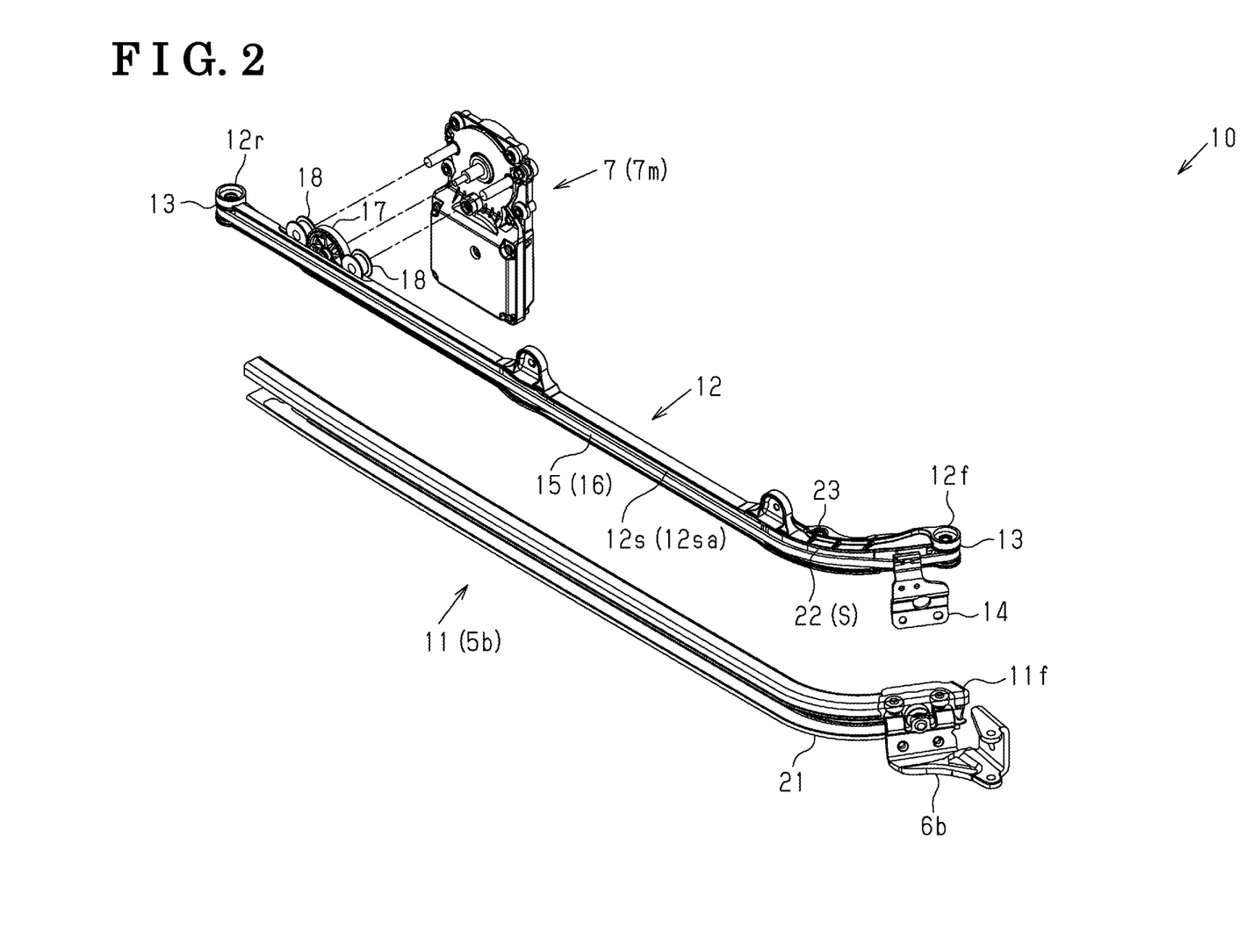
FIG. 2 is a perspective view of the power sliding door device.
Figure 3:
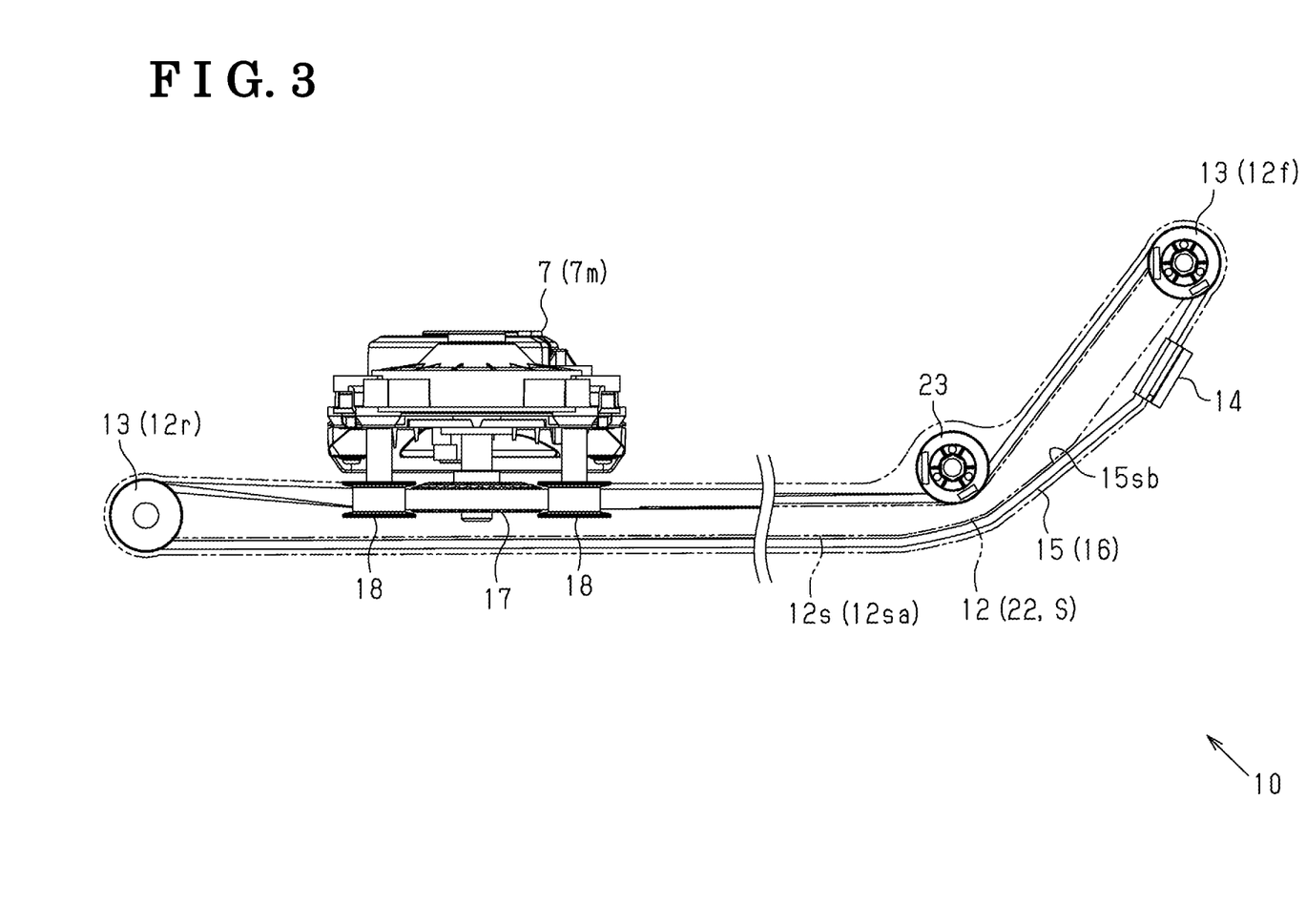
FIG. 3 is a plan view of the power sliding door device.

Specifically, as shown in FIGS. 1 to 3, the power sliding door device 10 according to the present embodiment includes a guide frame 12 provided in parallel with the guide rail 5b, that is, a center rail 11 provided at a height in the vicinity of a belt line and behind the door opening portion 3. Specifically, the guide frame 12 extends in the front-rear direction of the vehicle, which is an opening and closing operation direction of the sliding door 4, in a state in which the guide frame 12 is integrated with the center rail 11. The power sliding door device 10 includes a pair of pulleys 13, 13 provided at corresponding two ends of the guide frame 12 in a longitudinal direction. Further, the power sliding door device 10 includes an annular driving belt 15, which includes a coupling portion 14 coupled to the sliding door 4 and is wound around the pulleys 13, 13. The power sliding door device 10 according to the present embodiment is configured such that the driving belt 15 is rotationally driven by the actuator 7 provided in the vicinity of a rear end portion 12r of the guide frame 12.

That is, in the power sliding door device 10 according to the present embodiment, the driving belt 15 wound around the pulleys 13, 13 is rotated based on the driving force of the actuator 7, so that the coupling portion 14 provided on the driving belt 15 moves in the front-rear direction of the vehicle. Further, in the power sliding door device 10 according to the present embodiment, the coupling portion 14 is fixed to the guide roller unit 6b that engages with the center rail 11. Thus, the power sliding door device 10 according to the present embodiment is configured such that the sliding door 4 coupled to the driving belt 15 through the coupling portion 14 and the guide roller unit 6b moves, that is, opens and closes in the front-rear direction of the vehicle.

More specifically, as shown in FIGS. 2 and 3, the guide frame 12 according to the present embodiment has a rail-shaped outline including a side wall portion 12s facing a vehicle width direction. Further, as described above, the guide frame 12 is disposed within an annular shape of the driving belt 15 since the driving belt 15 is wound around the pair of pulleys 13, 13 provided at respective two ends of the guide frame in the longitudinal direction. Thus, the guide frame 12 according to the present embodiment guides the driving belt 15 in a state in which the side wall portion 12s faces an inner periphery of the driving belt 15.

The driving belt 15 according to the present embodiment has a configuration as a toothed belt 16 having tooth portions on the inner periphery of the driving belt. Further, the guide frame 12 is provided with a toothed pulley 17 in the vicinity of the rear end portion 12r, and the toothed pulley 17 meshes with the tooth portions of the driving belt 15. The power sliding door device 10 according to the present embodiment is configured such that the driving force of the actuator 7 is transmitted to the driving belt 15 through the toothed pulley 17.

In the guide frame 12 according to the present embodiment, the toothed pulley 17 has a rotation shaft extending in a direction intersecting the longitudinal direction of the guide frame 12. Specifically, the toothed pulley 17 is supported by the guide frame 12 in a state in which the rotation shaft of the toothed pulley 17 is oriented in the vehicle width direction. Further, the guide frame 12 according to the present embodiment is provided with a pair of pressing pulleys 18, 18 that sandwich both sides of the toothed pulley 17 in the longitudinal direction of the guide frame 12. In the power sliding door device 10 according to the present embodiment, the driving belt 15 is wound around the pressing pulleys 18, 18 and the toothed pulley 17 alternately, so that the driving belt 15 in a twisted state can be rotationally driven in a stable manner.

As shown in FIG. 2, in the vehicle 1 according to the present embodiment, the center rail 11 includes a curved corner portion 21 in the vicinity of a front end portion 11f. That is, the corner portion 21 curves an extending direction of the center rail 11 inward in the vehicle width direction and toward the front side of the vehicle. Further, similarly to the corner portion 21, each of the other guide rails 5 also includes a corner portion (not shown) that curves an extending direction of the guide rail inward in the vehicle width direction and toward the front side of the vehicle. Thus, the power sliding door device 10 according to the present embodiment is configured such that the sliding door 4 supported on the side surface 2s of the vehicle body 2 by the guide rails 5 and the guide roller units 6 can be opened and closed without interfering with the vehicle body 2.

More specifically, in the vehicle 1 according to the present embodiment, the center rail 11 is fixed to the vehicle body 2 in a state in which the corner portion 21 and the front end portion 11f of the center rail 11 are disposed at a rear edge portion 3r of the door opening portion 3 (see FIG. 1). Thus, the vehicle 1 according to the present embodiment is configured such that the sliding door 4 in the fully closed state is flush with the side surface 2s of the vehicle body 2.

As shown in FIGS. 2 and 3, in the power sliding door device 10 according to the present embodiment, the guide frame 12 also includes a curved corner portion 22 in the vicinity of a front end portion 12f of the guide frame 12, similarly to the corner portion 21 of the center rail 11. That is, the corner portion 22 also curves an extending direction of the guide frame 12 inward in the vehicle width direction and toward the front side of the vehicle. Thus, in the power sliding door device 10 according to the present embodiment, the driving belt 15 including the coupling portion 14 coupled to the sliding door 4 is rotationally driven in a state of being along an opening and closing operation trajectory of the sliding door 4 that moves in the front-rear direction of the vehicle while being displaced in the vehicle width direction.

Specifically, the guide frame 12 according to the present embodiment is located inside the annular driving belt 15, so that the driving belt 15 is in sliding contact with the corner portion 22. Specifically, in the guide frame 12, a portion of an outer side wall portion 12sa facing outward in the vehicle width direction, which is located at the corner portion 22, serves as a sliding contact surface S for contact with the driving belt 15. The guide frame 12 according to the present embodiment includes a pressing pulley 23 provided at a position on an inner side in a radial direction of the corner portion 22. Further, the driving belt 15 according to the present embodiment is wound around the pressing pulley 23, and is thus also routed along the curved corner portion 22 even at a position on an inner side in the vehicle width direction of the guide frame 12. Accordingly, the power sliding door device 10 according to the present embodiment is configured such that the driving belt 15 is rotationally driven in a state in which the driving belt 15 extends along the side wall portion 12s over substantially an entire region in the longitudinal direction of the guide frame 12 including the corner portion 22.

(Low Sliding Resistance Portion)

Next, a low sliding resistance portion provided on the sliding contact surface S defined by the guide frame 12 for contact with the driving belt 15 according to the present embodiment will be described.

Figure 4:
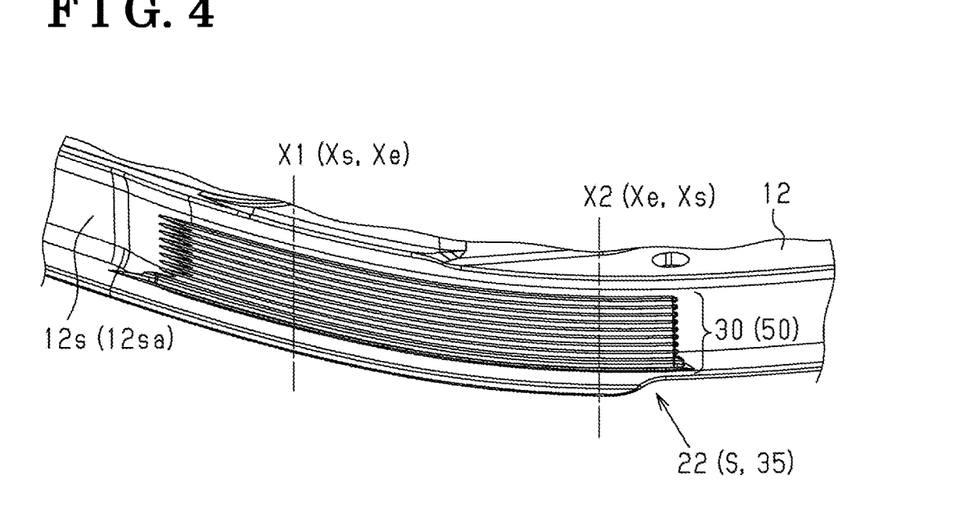
FIG. 4 is a perspective view of a low sliding resistance portion provided at a corner portion of a guide frame.
Figure 5:
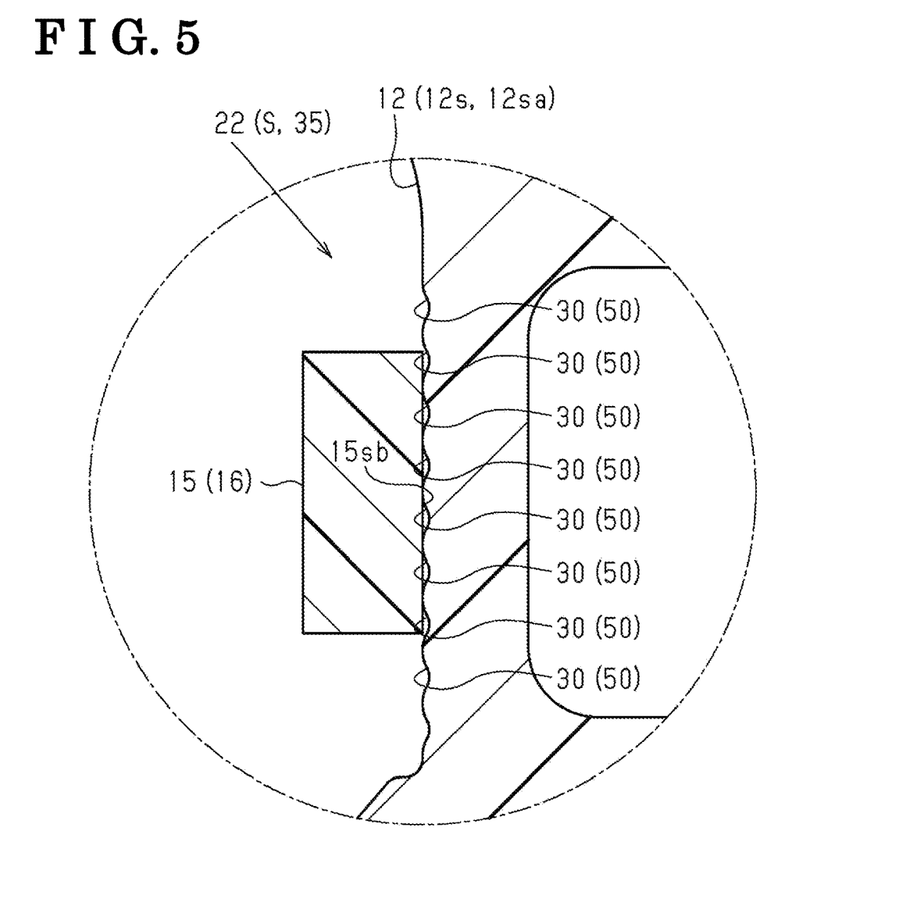
FIG. 5 is a cross-sectional view of the low sliding resistance portion.

As shown in FIGS. 4 and 5, in the power sliding door device 10 according to the present embodiment, a plurality of linear grooves 30 extending in the longitudinal direction of the guide frame 12 are provided in the sliding contact surface S defined by the corner portion 22 of the guide frame 12 for contact with the driving belt 15. That is, each of the linear grooves 30 extends along a sliding direction (the left-right direction in FIG. 4, a direction orthogonal to a paper surface in FIG. 5) of the driving belt 15 that is rotationally driven in a state of being in sliding contact with the corner portion 22 of the guide frame 12 during the opening and closing operation of the sliding door 4. Specifically, in the guide frame 12 according to the present embodiment, the linear grooves 30 extend over substantially the entire region of the corner portion 22 that curves and extends in an arc shape. Thus, in the power sliding door device 10 according to the present embodiment, the linear grooves 30 define a low sliding resistance portion 35 having low sliding resistance at the corner portion 22 of the guide frame 12 serving as the sliding contact surface S for contact with the driving belt 15.

More specifically, as shown in FIGS. 4 and 5, the linear grooves 30 are recessed in parallel with each other with respect to the outer side wall portion 12sa defining the sliding contact surface S for contact with the driving belt 15 at the position of the corner portion 22 of the guide frame 12. Thus, in the guide frame 12 according to the present embodiment, a contact area of the corner portion 22 in sliding contact with the driving belt 15 is reduced by the linear grooves 30 arranged in a comb shape.

Further, as shown in FIG. 4, the linear grooves 30 extend continuously on the sliding contact surface S defined by the corner portion 22 of the guide frame 12 for contact with the driving belt 15 in a range in which the driving belt 15 is easily brought into sliding contact with the sliding contact surface S. Specifically, the linear grooves 30 extend continuously at least from a sliding contact start point Xs to a separation point Xe of the driving belt 15 formed on the sliding contact surface S. That is, the sliding contact start point Xs is a point at which the driving belt 15 starts sliding-contact with the sliding contact surface S, and the separation point Xe is a point at which the driving belt 15 separates from the sliding contact surface S. In addition, the sliding contact start point Xs and the separation point Xe are replaceable with each other in accordance with a rotation direction of the driving belt 15. In the power sliding door device 10 according to the present embodiment, for example, the sliding contact start point Xs and the separation point Xe are formed at two positions X1 and X2 shown in FIG. 4. Thus, the guide frame 12 according to the present embodiment is configured such that the linear grooves 30 can appropriately define the low sliding resistance portion 35 on the sliding contact surface S.

That is, in the driving belt 15 having a configuration as the toothed belt 16, the sliding resistance may increase since the tooth portions are caught on the sliding contact surface S. However, as described above, the linear grooves 30 extend continuously between the sliding contact start point Xs and the separation point Xe of the driving belt 15, and thus such catching of the tooth portions is limited. Thus, the guide frame 12 according to the present embodiment is configured such that the sliding resistance at positions where the linear grooves 30 are formed can be effectively reduced.

Figure 6:
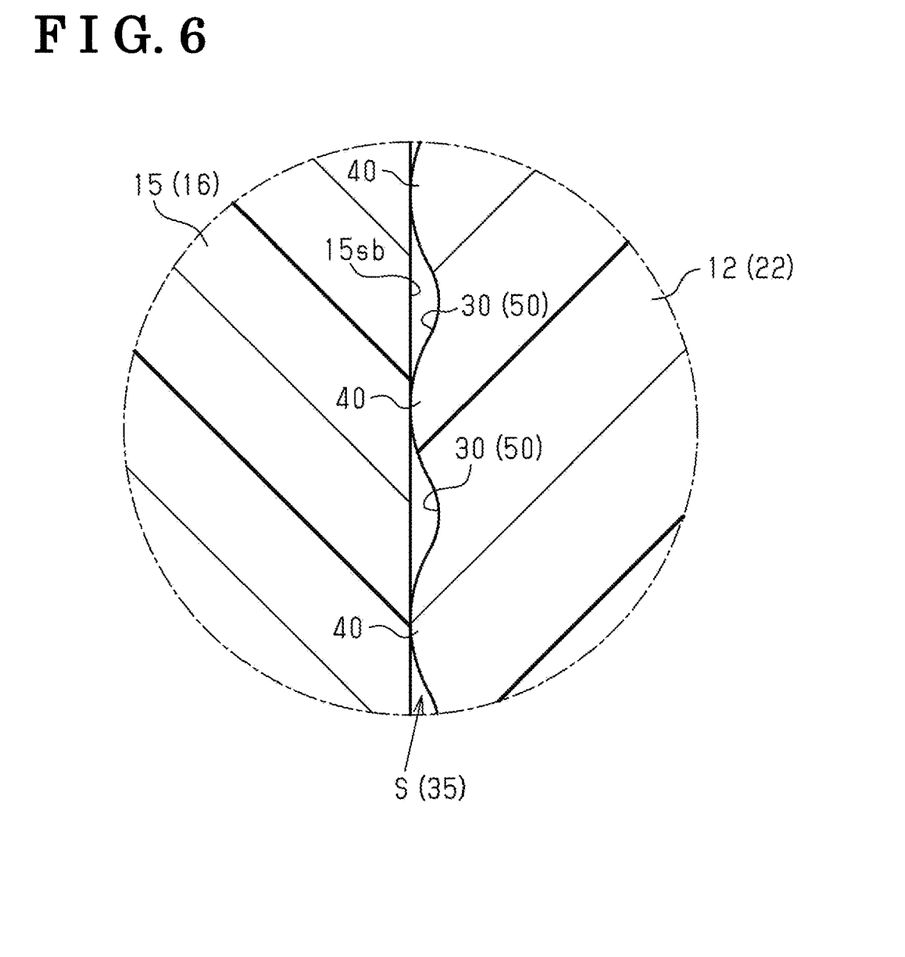
FIG. 6 is an enlarged cross-sectional view of the low sliding resistance portion.

More specifically, as shown in FIGS. 5 and 6, linear protrusions 40 extending in the sliding direction of the driving belt 15 are formed between the linear grooves 30. Specifically, each of the linear protrusions 40 has a substantially arc-shaped cross section that protrudes toward an inner peripheral surface 15sb of the driving belt 15 in sliding contact with the low sliding resistance portion 35. Thus, in the power sliding door device 10 according to the present embodiment, the linear protrusions 40 are in line contact with the inner peripheral surface 15sb of the driving belt 15.

Next, functions of the present embodiment will be described.

That is, a plurality of recessed portions 50 are formed in the sliding contact surface S between two members that are in sliding contact with each other, and a contact state between the two members is changed, and thus sliding resistance between the two members may be reduced. By utilizing this fact, the low sliding resistance portion 35 is provided on the sliding contact surface S defined by the guide frame 12 for contact with the driving belt 15. Accordingly, the sliding resistance of the driving belt 15 that slides on the sliding contact surface S is reduced.

Next, effects of the present embodiment will be described.

(1) The power sliding door device 10 as a vehicle opening and closing body driving device includes the annular driving belt 15, which includes the coupling portion 14 coupled to the sliding door 4 serving as an opening and closing body and is rotationally driven. In addition, the power sliding door device 10 includes the guide frame 12 having the sliding contact surface S on which the driving belt 15 slides and extending in an opening and closing operation direction of the sliding door 4. The sliding contact surface S is provided with the low sliding resistance portion 35 having the plurality of recessed portions 50.

According to the above configuration, sliding resistance of the driving belt 15 that slides on the sliding contact surface S defined by the guide frame 12 accompanying with opening and closing of the sliding door 4 can be reduced. Accordingly, operation resistance when the sliding door 4 is opened and closed can be reduced. As a result, a size of the actuator 7 can be reduced, and the sliding door 4 can also be opened and closed with a smaller operation force even during manual operation.

(2) The low sliding resistance portion 35 includes, as the plurality of recessed portions 50 provided in the sliding contact surface S, the plurality of linear grooves 30 extending in a sliding direction of the driving belt 15.

According to the above configuration, the sliding resistance of the driving belt 15 can be effectively reduced.

(3) The linear grooves 30 extend continuously at least from the sliding contact start point Xs to the separation point Xe of the driving belt 15 formed on the sliding contact surface S.

According to the above configuration, the low sliding resistance portion 35 can be appropriately formed on the sliding contact surface S. In particular, in the driving belt 15 having a configuration as the toothed belt 16, the sliding resistance may increase since the tooth portions are caught on the sliding contact surface S. However, as described above, the linear grooves 30 extend continuously between the sliding contact start point Xs and the separation point Xe of the driving belt 15, and thus such catching of the tooth portions is limited. Thus, the sliding resistance at positions where the linear grooves 30 are formed can be effectively reduced.

(4) The linear protrusions 40 extending in the sliding direction of the driving belt 15 are formed between the linear grooves 30. The linear protrusions 40 are in line contact with the driving belt 15.

According to the above configuration, the sliding resistance of the driving belt 15 can be more effectively reduced.

(5) The guide frame 12 includes the curved corner portion 22 and extends within an annular shape of the driving belt 15. The guide frame 12 includes the low sliding resistance portion 35 provided on the sliding contact surface S defined by the corner portion 22 for contact with the driving belt 15.

That is, the corner portion 22 of the guide frame 12 extending within the annular shape of the driving belt 15 is likely to be the normal sliding contact surface S for contact with the driving belt 15, and surface pressure thereof is likely to be high. Therefore, by providing the low sliding resistance portion 35 at the corner portion 22, the sliding resistance of the driving belt 15 can be effectively reduced.

(6) The power sliding door device 10 includes the guide frame 12 provided in parallel with the center rail 11 extending to a rear side of the door opening portion 3.

That is, the center rail 11 of the sliding door 4 that opens and closes the door opening portion 3 of the vehicle 1 and that is provided on the side surface 2s of the vehicle body 2 is usually fixed to the vehicle body 2 in a state in which the corner portion 21 and the front end portion 11f of the center rail 11 are disposed at the rear edge portion 3r of the door opening portion 3. Therefore, a curvature radius smaller than a curvature radius of the other guide rails 5 is often set at the corner portion 21. Accordingly, a small curvature radius is also set at the corner portion 22 of the guide frame 12 parallel to the center rail 11. Since the corner portion 22 defines the sliding contact surface S for contact with the driving belt 15, the sliding resistance tends to increase. Therefore, a more remarkable effect can be obtained by providing the low sliding resistance portion 35 on the sliding contact surface S of the guide frame 12 parallel to the center rail 11.

The above embodiment can be modified and implemented as follows. The above embodiment and the following modifications can be combined with each other as long as the embodiment and the modifications do not have a technical contradiction.

In the above embodiment, the toothed belt 16 is used as the driving belt 15, but this disclosure may be applied to a configuration in which the driving belt 15 having no tooth portion is used.

In the above embodiment, the linear grooves 30 defining the low sliding resistance portion 35 in the corner portion 22 of the guide frame 12 extend over substantially the entire region of the corner portion 22. Alternatively, this disclosure is not limited thereto, and a length of each linear groove 30 extending in the sliding direction of the driving belt 15, that is, an extending length thereof may be freely changed.

Figure 7:
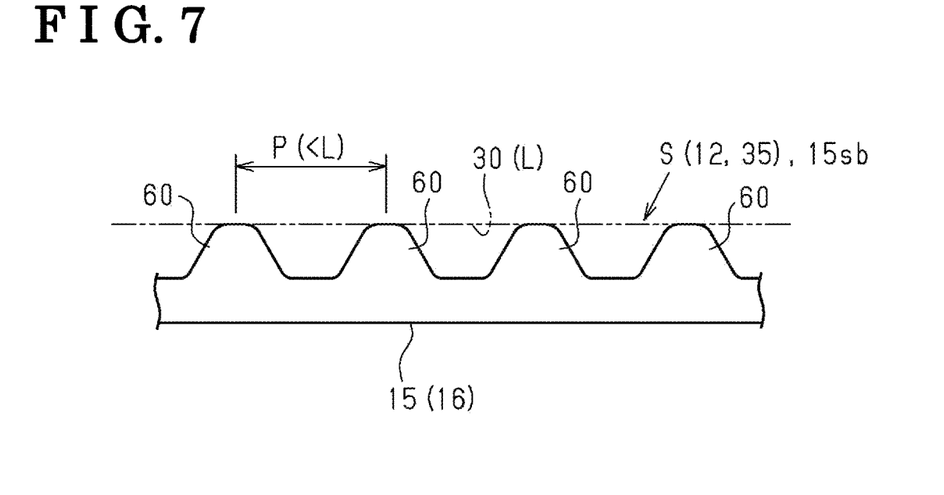
FIG. 7 is a plan view of a driving belt in sliding contact with the guide frame.

However, as shown in FIG. 7, when the toothed belt 16 having tooth portions 60 is used for the driving belt 15 as in the embodiment described above, it is desirable to appropriately set an extending length L of each linear groove 30 recessed in the sliding contact surface S. Specifically, in this case, the extending length L of each linear groove 30 is preferably larger than a pitch P of the tooth portions 60 (P<L).

That is, by adopting such a configuration, the tooth portions 60 of the driving belt 15 are less likely to be caught on the linear grooves 30. Accordingly, the sliding resistance of the driving belt 15 can be effectively reduced.

In particular, as in the embodiment described above, it is preferable that the linear grooves 30 extend continuously between the sliding contact start point Xs and the separation point Xe of the driving belt 15 formed on the sliding contact surface S. In this case, the extending length L may be set in accordance with the sliding contact start point Xs and the separation point Xe. For example, in the embodiment described above, the sliding contact start point Xs and the separation point Xe are replaceable with each other in accordance with a rotation direction of the driving belt 15, but positions of the sliding contact start point Xs and the separation point Xe may not necessarily be the same two positions and may be shifted in the rotation direction of the driving belt 15. In this case, the extending length L of each linear groove 30 may be set to a length covering the sliding contact start point Xs and the separation point Xe in both rotation directions.

Further, in order to define the low sliding resistance portion 35, shapes of the recessed portions 50 provided in the sliding contact surface S for contact with the driving belt 15 may not necessarily be the linear grooves 30 as described above. That is, as long as the sliding resistance of the driving belt 15 in sliding contact with the sliding contact surface S can be reduced, the shapes of the recessed portions 50 may be freely changed, for example, into a circular shape or a polygonal shape such as a rhombus.

In the above embodiment, the low sliding resistance portion 35 is provided on the sliding contact surface S defined by the corner portion 22 of the guide frame 12. However, this disclosure is not limited thereto, and a position of the sliding contact surface S on which the low sliding resistance portion 35 is provided may be set freely.

Figure 8:
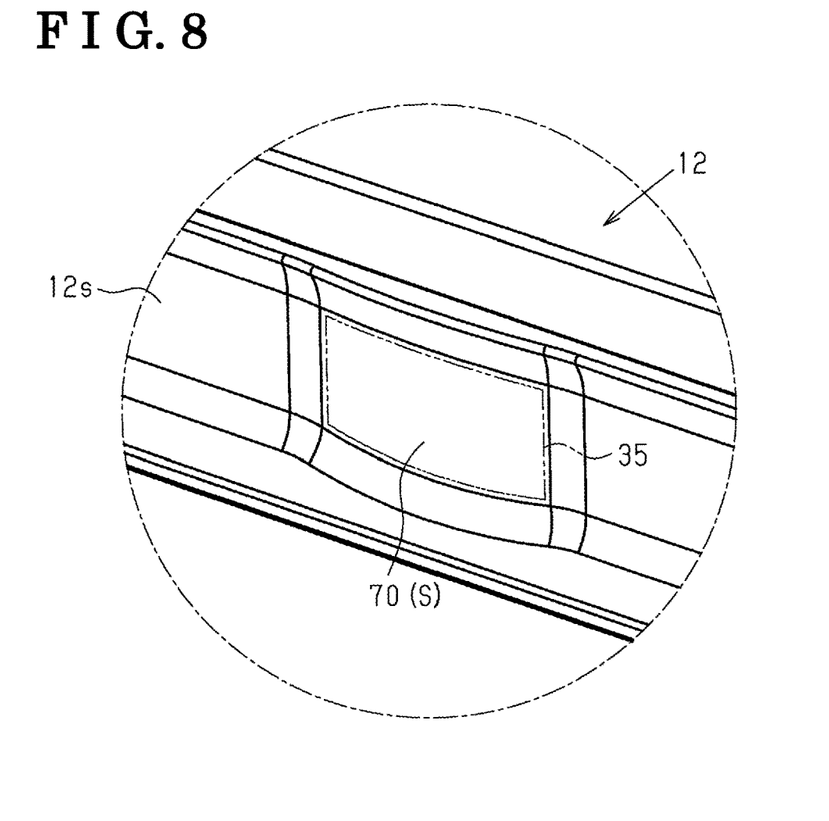
FIG. 8 is a perspective view of a protruding portion provided on the guide frame.

For example, as shown in FIG. 8, when the side wall portion 12s of the guide frame 12 is provided with a protruding portion 70 that protrudes toward the driving belt 15, the low sliding resistance portion 35 may also be provided on the sliding contact surface S defined by the protruding portion 70 for contact with the driving belt 15.

That is, there is a possibility that the driving belt 15 flutters due to an influence of disturbance or the like. In such a case, the protruding portion 70 is likely to be the sliding contact surface S for contact with the driving belt 15 in proximity to the side wall portion 12s of the guide frame 12. Therefore, according to the above configuration, the sliding resistance of the driving belt 15 can be effectively reduced.

In addition, the protruding portion 70 provided on the side wall portion 12s of the guide frame 12 has an effect of avoiding a situation in which the inner peripheral surface 15sb of the driving belt 15 is in surface contact with the side wall portion 12s of the guide frame 12 when the driving belt 15 having an annular shape is displaced in a radial direction. Therefore, even when the protruding portion 70 does not include the low sliding resistance portion 35, an effect of reducing the sliding resistance can also be obtained.

Further, even at a position where the protruding portion 70 is not provided, the low sliding resistance portion 35 may also be provided on the side wall portion 12s of the guide frame 12 facing the driving belt 15. For example, the plurality of linear grooves 30 may also extend over an entire surface of the side wall portion 12s. Even when such a configuration is adopted, the sliding resistance of the driving belt 15 can also be reduced.

When a member which is located on an outer side in a radial direction of the annular driving belt 15 and is in sliding contact with an outer peripheral surface 15sa of the annular driving belt 15 is provided, the low sliding resistance portion 35 may also be provided on the sliding contact surface S defined by the member for contact with the driving belt 15.

Figure 9:
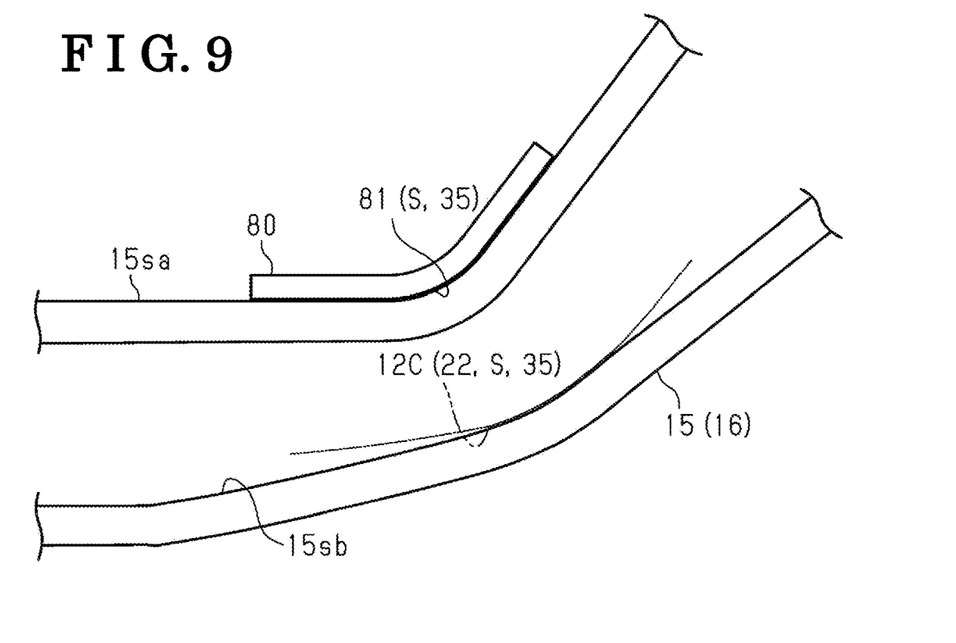
FIG. 9 is a plan view showing another example of the guide frame.

For example, a guide frame 12C shown in FIG. 9 includes, instead of the pressing pulley 23 in the above embodiment, a pressing member 80 having a substantially curved plate shape provided at a position on an inner side in a radial direction of the corner portion 22. Specifically, the pressing member 80 extends along the curved corner portion 22 at a position on an inner side (upper side in FIG. 9) in the vehicle width direction of the guide frame 12. The driving belt 15 is routed along the curved corner portion 22 in a state in which the outer peripheral surface 15sa is in sliding contact with the pressing member 80.

That is, in the example shown in FIG. 9, the pressing member 80 forms a protruding portion 81 that protrudes toward the driving belt 15. In such a configuration, the low sliding resistance portion 35 may be provided on the sliding contact surface S defined by the pressing member 80 as the protruding portion 81 for contact with the driving belt 15. Accordingly, the sliding resistance of the driving belt 15 can be effectively reduced.

In the above embodiment, the guide frame 12 in parallel with the center rail 11 extending to a rear side of the door opening portion 3 is provided. However, this disclosure is not limited thereto, and may be embodied in a configuration in which the guide frame 12 is provided in parallel to an upper rail provided above the door opening portion 3 or a lower rail provided below the door opening portion 3. That is, similarly to the corner portion 21 of the center rail 11, the guide rails 5a and 5c respectively forming the upper rail and the lower rail each include a corner portion that curves an extending direction of the guide rail inward in the vehicle width direction and toward the front side of the vehicle. Therefore, in the guide frame 12 parallel to the upper rail or the lower rail, the sliding resistance of the driving belt 15 can also be reduced by, for example, providing the low sliding resistance portion 35 at the corner portion 22 defining the sliding contact surface S for contact with the driving belt 15.

In the above embodiment, the actuator 7 is provided in the vicinity of the rear end portion 12r of the guide frame 12. However, this disclosure is not limited thereto, and the arrangement of the actuator 7 may be freely changed. A configuration of the actuator 7 and a driving method of the driving belt 15 may also be freely changed.

The above embodiment is embodied as the power sliding door device 10 in which the sliding door 4 is opened and closed based on driving force generated by the actuator 7 using the motor 7m as a driving source. However, this disclosure is not limited thereto, and may be applied to other vehicle opening and closing body driving devices that drive an opening and closing body other than the sliding door 4, such as a sunroof device or a window regulator device.

A vehicle opening and closing body driving device according to an aspect of the disclosure includes an annular driving belt including a coupling portion coupled to an opening and closing body of a vehicle and configured to be rotationally driven, and a guide frame having a sliding contact surface with which the driving belt is in sliding contact and extending in an opening and closing operation direction of the opening and closing body. The sliding contact surface is provided with a low sliding resistance portion having a plurality of recessed portions.

According to the above configuration, sliding resistance of the driving belt, which slides on the sliding contact surface defined by the guide frame in accordance with the opening and closing operations of the opening and closing body, can be reduced. Accordingly, the operation resistance when the opening and closing body is opened and closed can be reduced.

In the vehicle opening and closing body driving device according to the above aspect of the disclosure, the low sliding resistance portion may include, as the plurality of recessed portions described above, a plurality of linear grooves extending in a sliding direction of the driving belt.

According to the above configuration, the sliding resistance of the driving belt can be effectively reduced.

In the vehicle opening and closing body driving device according to the above aspect of the disclosure, the linear grooves may extend continuously at least from a sliding contact start point to a separation point of the driving belt formed on the sliding contact surface.

According to the above configuration, the low sliding resistance portion can be appropriately formed on the sliding contact surface.

In the vehicle opening and closing body driving device according to the above aspect of the disclosure, the driving belt may be a toothed belt having tooth portions, the guide frame may have the sliding contact surface with which the tooth portions are in sliding contact, and the linear grooves may have an extending length larger than a pitch of the tooth portions.

According to the above configuration, the tooth portions of the driving belt are less likely to be caught in the linear grooves. Accordingly, the sliding resistance of the driving belt can be effectively reduced.

In the vehicle opening and closing body driving device according to the above aspect of the disclosure, linear protrusions extending in the sliding direction of the driving belt may be formed between the linear grooves, and the linear protrusions may be in line contact with the driving belt.

According to the above configuration, the sliding resistance of the driving belt can be more effectively reduced.

In the vehicle opening and closing body driving device according to the above aspect of the disclosure, the guide frame may include a curved corner portion, extend within an annular shape of the driving belt, and may include the low sliding resistance portion provided on the sliding contact surface defined by the corner portion.

That is, the corner portion of the guide frame extending within the annular shape of the driving belt is likely to be a normal sliding contact surface for contact with the driving belt, and surface pressure is likely to be high. Therefore, by providing the low sliding resistance portion at the corner portion, the sliding resistance of the driving belt can be effectively reduced.

In the vehicle opening and closing body driving device according to the above aspect of the disclosure, the guide frame may include a protruding portion that protrudes toward the driving belt, and may include the low sliding resistance portion provided on the sliding contact surface defined by the protruding portion.

That is, there is a possibility that the driving belt flutters due to an influence of disturbance or the like. In such a case, the protruding portion as described above is likely to be a sliding contact surface for contact with the driving belt in proximity to the guide frame. Therefore, according to the above configuration, the sliding resistance of the driving belt can be effectively reduced.

In the vehicle opening and closing body driving device according to the above aspect of the disclosure, the opening and closing body may be a sliding door that opens and closes a door opening portion provided on a side surface of a vehicle body, the vehicle body may be provided with a guide rail that supports the sliding door on the vehicle body and that causes the sliding door to perform opening and closing operations in a front-rear direction of the vehicle, and the vehicle body may be provided with the guide frame that is in parallel with a center rail extending to a rear side of the door opening portion and forming the guide rail.

That is, the center rail of the sliding door that opens and closes the door opening portion of the vehicle is usually fixed to the vehicle body in a state in which the corner portion and a front end portion of the center rail are disposed at a rear edge portion of the door opening portion. Therefore, a curvature radius smaller than a curvature radius of the other guide rails is often set at the corner portion of the center rail. Accordingly, a small curvature radius is also set at the corner portion of the guide frame parallel to the center rail. Since the corner portion defines the sliding contact surface for contact with the driving belt, the sliding resistance tends to increase. Therefore, a more remarkable effect can be obtained by providing the low sliding resistance portion on the sliding contact surface of the guide frame parallel to the center rail.

According to this disclosure, operation resistance of an opening and closing body can be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle opening and closing body driving device comprising:
    an annular driving belt including a coupling portion coupled to an opening and closing body of a vehicle and configured to be rotationally driven; and
    a guide frame having a sliding contact surface with which the driving belt is in sliding contact and extending in an opening and closing operation direction of the opening and closing body, wherein
    the sliding contact surface is provided with a low sliding resistance portion having a plurality of recessed portions, and
    the low sliding resistance portion includes, as the plurality of recessed portions, a plurality of linear grooves extending in a sliding direction of the driving belt.

2. The vehicle opening and closing body driving device according to claim 1, wherein
    the linear grooves extend continuously at least from a sliding contact start point to a separation point of the driving belt formed on the sliding contact surface.

3. The vehicle opening and closing body driving device according to claim 1, wherein
    the driving belt is a toothed belt having tooth portions,
    the guide frame has the sliding contact surface with which the tooth portions are in sliding contact, and
    the linear grooves have an extending length larger than a pitch of the tooth portions.

4. The vehicle opening and closing body driving device according to claim 1, wherein
    linear protrusions extending in the sliding direction of the driving belt are formed between the linear grooves, and the linear protrusions are in line contact with the driving belt.

5. The vehicle opening and closing body driving device according to claim 1, wherein
    the guide frame includes a curved corner portion, and
    the low sliding resistance portion is provided on the sliding contact surface defined by the corner portion.

6. The vehicle opening and closing body driving device according to claim 1, wherein
    the guide frame includes a protruding portion that protrudes toward the driving belt, and
    the low sliding resistance portion is provided on the sliding contact surface defined by the protruding portion.

7. The vehicle opening and closing body driving device according to claim 1, wherein
    the opening and closing body is a sliding door that opens and closes a door opening portion provided on a side surface of a vehicle body,
    the vehicle body is provided with a guide rail that supports the sliding door on the vehicle body and that causes the sliding door to perform opening and closing operations in a front-rear direction of the vehicle, and
    the vehicle body includes the guide frame that is in parallel with a center rail extending to a rear side of the door opening portion and forming the guide rail.

* * * * *